United States Patent [19]

Tremper, III

[11] Patent Number: 5,068,063
[45] Date of Patent: Nov. 26, 1991

[54] NON-CARBON BLACK CONTAINING CONDUCTIVE COATING COMPOSITION

[75] Inventor: Henry S. Tremper, III, Clayton, N.J.

[73] Assignee: E. I. Du Pont de Nemours and Company, Wilmington, Del.

[21] Appl. No.: 461,471

[22] Filed: Dec. 28, 1989

[51] Int. Cl.$^5$ .............................................. H01B 1/06
[52] U.S. Cl. .................................... 252/518; 523/216; 523/521; 524/492
[58] Field of Search ................. 252/518; 523/521, 209, 523/216; 524/401, 492, 410, 411, 601; 525/342

[56] References Cited

U.S. PATENT DOCUMENTS

| | | | |
|---|---|---|---|
| 4,442,269 | 4/1984 | Sommerfeld et al. | 525/440 |
| 4,740,426 | 4/1988 | Tremper | 428/423.7 |
| 4,740,566 | 4/1988 | Tremper | 525/438 |

*Primary Examiner*—Josephine Barr
*Attorney, Agent, or Firm*—Hilmar L. Fricke

[57] ABSTRACT

A conductive coating composition containing solvents and 40–75% by weight of film forming binder and pigment in a pigment to binder weight ratio of about 1:100 to 100:100; wherein the binder contains (A) a hydroxy contain polyester resin and
(B) an aminoplast crosslinking agent; wherein the electrically conductive pigment is a silica which is either amorphous silica or a silica containing material, the silica is in association with a two-dimensional network of antimony-containing tin oxide crystallites in which the antimony content ranges from about 1–30% by weight of the tin oxide and the composition forms a coating on a substrate that has a surface conductivity of at least 100 Randsburg units. The coating can be used on metal or plastic substrates.

7 Claims, No Drawings

NON-CARBON BLACK CONTAINING CONDUCTIVE COATING COMPOSITION

BACKGROUND OF THE INVENTION

This invention is related to an electrically conductive coating and in particular an electrical conductive coating that does not contain carbon black pigment.

Primers and conductive primers are well known in the art and are used in the manufacture of automobiles and trucks Tremper US 4,470,426, issued April 26, 1988 shows a conductive primer composition. Also, conductive guide coats or primer surfacers used over plastic parts are known and are shown in Tremper U.S. Pat. No. 4,470,566, issued on April 26, 1988.

In modern auto and truck manufacturing facilities, the topcoat of paint is applied by electrostatic spraying which reduces paint losses and air pollution caused by paint over-spraying. Electrostatic spraying substantially reduces over-spraying since the electrostatic charge on the atomized paint particles results in most of the paint being deposited on the substrate. However, to efficiently electrostatically spray paint, the substrate must be electrically conductive. After a primer has been applied by either spraying, dipping or electrocoating to a steel autobody substrate such as a fender, door or hood or if the substrate is plastic, the substrate is not electrically conductive. The aforementioned primers, guide coats or primer surfacers can be applied. However, to achieve the needed level of conductivity, a conductive carbon black pigment is used which gives the composition a dark color which requires the use of a thicker layer of topcoat to cover the darker color of the primer, guide coat or primer surfacer. There is a need to eliminate the carbon black pigment and replace it with a conductive colorless pigment which would eliminate the color problem and allow for the use of normal topcoat thickness of paint. The use of less paint would reduce cost and air pollution problems.

SUMMARY OF THE INVENTION

A conductive coating composition containing solvents and 40-75% by weight of film forming binder and pigment in a pigment to binder weight ratio of about 1:100 to 100:100; wherein the binder contains
(A) a hydroxy contain polyester resin and
(B) an aminoplast crosslinking agent; wherein the pigment comprises an electrically conductive pigment of silica which is either amorphous silica or a silica containing material, the silica is in association with a two-dimensional network of antimony-containing tin oxide crystallites in which the antimony content ranges from about 1-30% by weight of the tin oxide and the composition forms a coating having a surface conductivity of at least 100 Ransburg units. The coating composition can be used on plastic substrates or previously coated substrates of either plastic or metals to render the substrate conductive.

DETAILED DESPRIPTION OF THE INVENTION

The conductive coating composition of this invention can be used as a primer, a primer surfacer, a guide coat over plastics such as polyester reinforced fiberglass, reaction injection molded urethanes, partially crystalline polyamides, polyarylates and the like, metals such as cold roll steel, phosphatized steel, coated metals such as primed steel, for example, primed by electrodeposition, spraying or dipping or previously painted metal substrates. The composition after curing provides a layer that is electrically conductive but does not have a dark color since carbon black pigment is not used to make the composition conductive. It is possible to have a composition that is colorless, the same color as the topcoat or of a light color that is easily hidden by the topcoat at a conventional film thickness. The topcoat may be a pigmented monocoat or a clear coat/base color coat.

The coating composition contains an electrically conductive pigment in a pigment to binder weight ratio of about 1 100 to 100:100. Preferably, the pigment is used in a pigment to binder ratio of 30 100 to 60:100. The pigment provides a coating of the composition that has a surface conductivity of at least 100 Randsburg Units and preferably, 125 and above Randsburg Units. The pigment does not provide a color to the coating composition. Surface conductivity of the coating composition is measured by a Sprayability Meter manufactured by Randsburg Electrocoating Corporation, Indianapolis, IN.

The electrically conductive pigment is a two-dimensional network of crystallites of antimony-containing tin oxide which exists in a unique association with amorphous silica or a silica-contaning material. The antimony-containing tin oxide forms a two-dimensional network of densely packed crystallites on the surface of the silica or silica-containing material. The silica or silica-containing material is a substrate, and the network comprises a generally uniform layer of crystallites in which the crystallites form an electrically conducting pathway to adjacent crystallites. The layer of tin oxide crystallites is typically about 5 to 20 nm in thickness but covers the surface of a particle with major dimensions that are typically ten to ten thousand times as large as the thickness of the tin oxide layer. The crystallites are, thus, part of a continuous conducting layer in two dimensions.

The silica substrate can be practically any shape. In the form of flakes or hollow shells, satisfactory results may be achieved when the two-dimensional network is formed on only one side of the silica substrate. In general, however, best results are obtained when practically all of the exposed surface of the silica substrate is coated with the crystallite layer.

The silica containing material of the silica substrate can be a metal silicate, silica containing glass or a material having an extensive co-valent network of $SiO_4$ units.

The pigment is a powder comprising shaped particles of amorphous silica which are coated with a two-dimensional network of antimony-containing tin oxide $[SnO_2(Sb)]$ crystallites. The finished particles, typically, are tens of microns to sub-micron in size, and they, in turn, are capable of forming an electroconductive network within the matrix of a thin paint film. The shaped particles of amorphous silica may be in the form of needles, platelets, spheres, dendritic structures or irregular particles. These provide an extended surface for the deposition of the antimony-containing tin oxide.

In one preferred pigment, the amorphous silica powder comprises thin shells or platelets less than about 20 nm in thickness. The pigment, when dispersed in a vehicle, is generally transparent, and its presence as a component of pigment in paint has little impact on color and related properties.

A process for preparing the electrically conductive pigment comprises:

(A) providing a substrate of amorphous hydroxylated silica or active silica-containing material, (B) applying a coating layer to the substrate surface consisting essentially of hydrous oxides of antimony and tin, and (C) calcining the coated substrate at a temperature in the range of 400° to 900° C. in an oxygen-containing atmosphere.

The coating layer of hydrous oxides of antimony and tin is applied to the hydroxylated substrate surface by adding aqueous solutions of hydrolyzable Sn and Sb salts to a slurry containing the silica at a pH in the range of about 1.5 to about 3.5, preferably at a pH of 2.0. Calcining the coated silica substrate perfects the crystalline phase of the $SnO_2(Sb)$ coating layer which imparts the desired electroconductive properties to the individual particles of the composition.

According to one aspect of the process for making the pigment, the substrate of amorphous hydroxylated silica or active silica-containing material is prepared by coating a finely divided solid core material with active silica and then removing the core material without unduly disturbing the silica coating. The substrate thus produced comprises hollow silica particles which are substantially translucent and which have the general shape of the core material. The silica coating should be sufficiently thin, for this purpose, so as not to reflect light. This will normally mean a thickness of less than about 250 nm. For most applications, thicknesses in the range of about 5 to 20 nm are preferred.

Active silica is conveniently prepared by gradually neutralizing an aqueous solution of sodium silicate or potassium silicate with a mineral acid, such as, for example, sulfuric acid or hydrochloric acid.

Active silica-containing materials may conveniently be applied as coatings for a selected core material by including other components along with the active silica in the reacting solution. For example, by adding sodium borate along with the sodium or potassium silicate, a silica-boria coating may be obtained. Such coatings are effective as a substrate so long as the surface of the coating contains hydroxylated silica functionalities. If the other component or components present in the silica-containing substrate inhibit the retention of hydroxyl groups on the substrate surface, then the subsequent $SnO_2(Sb)$ coating may not adhere completely and may, thus be less effective.

One useful conductive primer composition has a film forming binder of about (A) 40-70% by weight of a polyester polyol having reactive hydroxy groups; and (B) 30-60% by weight of an aminoplast resin.

The primer composition has a film forming binder content of about 40-75% by weight and correspondingly about 25-60% by weight of a liquid carrier which usually is a solvent for the binder.

A polyester polyol used in the composition has a linear polyester segment with hydroxyl groups that has a hydroxyl number of about 15-300 and a number average molecular weight of about 300-3,000 and has branched polyester segments. These branched segments contain hydroxyl groups and have a hydroxyl number of about 175-300 and a number average molecular weight of about 500-2,000 and are attached to the linear segment by esterification of the hydroxyl groups of the two segments with a diacid or an anhydride. The polyester copolymer has a number average molecular weight of about 800-3,500 and a hydroxyl number of about 50-170.

Molecular weight is determined by gel permeation chromatography using polymethyl methacrylate as the standard.

Summerfeld et al U.S. Pat. No. 4,442,269, issued April 10, 1984, which is hereby incorporated by reference, shows a method for preparing the above polyester polyol. Also, preferred polyester polyol compositions are disclosed.

The linear segment is formed from a straight chain diol and a dicarboxylic acid. Typical diols that are useful have from 2-10 carbon atoms and are for example ethylene glycol, propylene glycol, butane diol, pentane diol, neopentyl glycol, hexane diol, octane diol, Ester-diol 204 (a commercial diol produced by Union Carbide) and the like. Preferred diols are neopentyl glycol and 1,6 hexane diol since these diols form high quality polyesters.

Typical dicarboxylic acids that can be used aromatic acids such a phthalic acid, orthophthalic acid and isophthalic acid, and aliphatic acids such as adipic acid, azelaic acid and the like.

The branched segment is formed from a straight chain diol, a branched chain polyol and a dicarboxylic acid. The above straight chain diols and dicarboxylic acids are used. Typical branched chain polyols that can be used are trimethylol propane, triethylol propane, pentaerythritol and the like.

The linear and branched segments are attached by esterification of the hydroxyl groups of each segment with a diacid or an anhydride. The aforementioned acids can be used but preferably an anhydride is used. Typical anhydrides are orthophthalic anhydride, succinic anhydride, glutaric anhydride and the like.

One preferred polyester polyol has a linear chain segment of a polyester of neopentyl glycol, hexane diol, isophthalic acid and azelaic acid and branched chain segments of a polyester of neopentyl glycol, trimethylol propane, isophthalic acid and azelaic acid and are esterified with orthophthalic anhydride. The molar ratio of linear chain segment/anhydride/branched chain segment is 1/1/1 and copolymer has a number average molecular weight of about 800-1,500 and a hydroxyl number of 125-155.

The polyester segments and polyester polyol are prepared by conventional esterification procedures in which the components are charged into a polymerization vessel with solvents and usually a esterification catalyst and heated to about 100°-200° C. for about 30 minutes to 5 hours with removeal of water that is formed during the process.

The crosslinking agent used in the composition is an alkylated melamine formaldehyde crosslinking resin. Typically, these resins have 1-8 carbon atoms in the alkyl group. Methylated melamine formaldehyde resins such as "Cymel" 380 and methylated melamine formaldehyde resins containing methoxymethyl imino groups such as "Cymel" 325 are preferred to form a high quality primer. One preferred combination is a blend of 40-60% by weight of "Cymel" 380 and correspondingly about 60-40% by weight of "Cymel" 325.

The resulting finish formed by the primer composition should be flexible so that it can be used over flexible plastic substrates. Flexibility of the finish is determined by the mandrel bend test in which a panel coated with about 1.0 mil thick fully cured film of the coating decomposition is held at −29° C. and then bent around a ½ inch diameter steel mandrel with the coated side of the panel facing outward. The coating should not break or crack.

One useful primer surfacer or guide coat has as the film forming binder about (A) 40–70% by weight of a polyester polyol having reactive hydroxy groups;
(B) 20–40% by weight of an aminoplast resin; and
(C) 5–10% by weight of an epoxy resin.

The primer-surfacer or guide coat compositions use as the film-forming component crosslinkable polyester polyols of dimethyl 1,4-dicyclohexanedicarboxylate, dicarboxylic acids, and branched-chain glycols of 2–8 carbon atoms, in addition to conventional aminoplast crosslinking or curing agents and epoxy resins. The composition cures at conventional curing temperatures to provide high gloss coatings. These compositions are designed to be applied over electrodeposited primer, sanded where needed, and then topcoated by electrostatic spraying with a colored base coat followed by a clear coat.

The film-forming component comprises 50–70% percent, preferably 50–60 percent, of the weight of the primer-surfacer composition.

The polyester polyol used is a polymer of 1,4-dicylcohexanedicarboxylic acid, one or more dicarboxylic acids and one or more branched chain glycols or polyols preferably having 4–8 carbon atoms.

The dicarboxylic acids employed in the polyester polyols used in this invention have the general formula

where R is aliphatic or aromatic. The most useful aliphatic acids are alkylene, vinylene, or cycloaliphatic.

Preferred acids where R is alkylene are those in which R has 2–10 carbons. Most preferred are succinc acid, glutaric acid, azelaic acid, dodecanoic acid, pimelic acid, and adipic acid. Of the foregoing, adipic acid is preferred. Preferred aromatic dicarboxylic acids are phthalic, isophthalic, terephthalic, uvitic, and cumitic acids, of which isphthalic is most preferred. It should be noted that lower alkyl mono- or di-esters of the foregoing acids, or anhydrides, can be employed with equivalent results. In this context, "lower alkyl" refers to alkyl radicals having 1–5 carbons. Examples include phthalic anhydride, maleic anhydride, tetrahydrophthalic anhydride, hexahydrophthalic anhydride, methyltetrahydrophthalic anhydride, methylhexahydrophthalic anhydride and trimellitic anhydride.

Preferably, mixtures of dicarboxylic acids are used wherein the mole ratio of aromatic to aliphatic dicarboxylic acids range from 2:1 to 6:1. A ratio of about 5:1 aromatic to aliphatic is most preferred.

The branched-chain glycol or polyol components used in preparing the polyester polyol can be any branched-chain glycol or polyol having 2–8 carbons. Typical glycols are ethylene glycol, propylene glycol, butylene glycol, and neopentyl glycol. However, neopentyl glycol and trimethylolpropane, and in particular, mixtures of neopentyl glycol and trimethylolpropane are preferred for use in preparing compositions of the present invention.

The polyester polyol can be produced by charging the reactants, a suitable solvent, and optionally a reaction catalyst into a reaction vessel equiped with a condenser and an agitator.

The reaction mixture is heated to reflux, usually 100–300° C., and there maintained for a period of from 1–8 hours. The polyester reaction product should have a number average molecular weight of from 1000–2200 and a weight average molecular weight of from 2200–4400.

In preparing the above copolymers acid values below 40, particularly in the range 0.1–20, are preferred. Hydroxyl values should be in the range 50–250 KOH mg/g. Preferably, hydroxyl values are in the range 100–250 KOH mg/g.

Any of the aforementioned alkylated melamine formaldehyde crosslinking resins can be used. Preferred is a butylated melamine formaldehyde resin.

The primer surfacer also contains an epoxy resin. Epoxy resins often referred to simply as "epoxies", are generally known and are prepared by well known techniques. They are compounds or mixtures of compounds containing at least one, but typically more thane one, 1,2-epoxy group of the formula

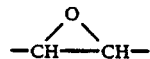

i.e., polyepoxides may be saturated or unsaturated, aliphatic, cycloaliphatic, aromatic or heterocyclic. Examples of suitable polyepoxides include the generally known polyglycidyl ethers of polyphenols and/or polypoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxy-1,5-dihydroxynaphthalene; 1,1-bis(4-hydroxy-3-allyphenyl)ethane; and hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like. In addition, polymerized resins containing epoxy groups may also be employed. These polyepoxides may be produced by the addition polymerization of epoxy functional monomers such as glycidy acrylate, glycidyl methacrylate and allyl glycidyl ether optionally in combination with ethylencially unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate. Many additional examples of epoxy resins are described in the *Handbook of Epoxy Resins,* Henry Lee and Kris Neville, 1967, McGraw Hill Book Company.

Additionally, the above primer and primer surfacer compositions can contain suitable catalyst to enhance the cure of the coating composition. Suitable catalysts include those customarily employed to promote cross-linking between hydroxy-functional polyesters and aminoplasts and epoxy resins.

Examples of typical catalysts which can be employed in coating compositions of the invention include organic sulfonic acids such as paratoluenesulfonic acid, stannous octoate, dibutyltin dilaurate, naphthalene sulfonic acid, naphthalene disulfonic acid, the organic esters of the sulfonic acids, and the like. Preferred are paratoluenesulfonic acid and dinonylnaphthalenesulfonic acid. The sulfonic acids can be neutralized with an amine, preferably a tertiary amine.

Any of the conventional solvents or blends of solvents can be used to form the above composition provided that the selection of solvents is such that the polymeric constituents are compatible and give a high quality primer as primer surfacer. The following are examples of solvents which can be used to prepare the composition: methylethyl ketone, methylamyl ketone, methyl isobutyl ketone, toluene, acetone, xylene, isopropanol, ethylene glycol monoethyl ether acetate, and other esters, ethers, ketones, and aliphatic, cycloaliphatic and aromatic hydrocarbon solvents.

In addition to the above descibed electrically conductive silica pigment, variety of pigments, organic dyes and lakes can be utilized in the compositions of this invention. Examples of the useful pigments are: metallic oxides, such as titanium dioxide, iron oxide, zinc oxide and the like; metal hydroxides, metal powders, sulfides, sulfates, carbonates, silicates such as aluminum silicate, carbon black, talc, china clay, barytes, iron blues, lead blues, organic reds and organic maroons and the like.

Pigments can be introduced into the compositions of the invention by first forming a mill base with the polyester polyol. The mill base can be formed, for example, by conventional sand-grinding or ball-milling techniques, and then can be blended, by simple stirring or agitation, with the other constituents of the coating composition.

In addition to the essential components described above, compositions within the scope of the present invention can also include flow control agents, drying oils, and fillers. Flow control agents, for example, include polymers such as polyalkyl acrylates and methacrylates (e.g. Resiflow ®L, available from the SBS Chemical Company), fluorinated polymers such as fluorinated esters of polyethylene glycol or polypropylene glycol, methyl phenyl polysiloxanes, or mixtures of silica an dpolyvinylpyrrolidone.

Drying oils, which can be present up to about 15 percent by weight (based on binder only) include castor oil, tung oil, soya oil, linseed oil, and other suitable equivalents.

The composition can contain about 0.01-2% by weight, based on the weight of the binder, of ultraviolet light stabilizers which term includes ultraviolet light absorbers, screener and quenchers. Typical ultraviolet light stabilizers include benzophenones, triazines, triazols, benzoates, hindered amines and blends of thereof The compositions can be applied to a substrate by conventional techniques such as spraying, electrostatic spraying, dipping, brushing, flowcoating and the like. The preferred method is electrostatic spraying. After application, the composition is baked at about 100-200° C. for about 5-45 minutes to form a coating layer about 0.1-2.0 mils thick. Generally, the primer layer is about 0.5-1.5 mils thick. Primer surfacer layer or guide coat is about 0.5-2.0 mils thick. Conventional solvent borne or water borne acrylic enamels or lacquers, acrylic polyurethane coatings, polyesterurethane coatings, alkyd enamels and the like can be applied efficiently by electrostatic spraying and then baked to form a durable automotive or truck finish on the substrate.

The following examples illustrate the invention. All parts and percentages are on a weight basis unless indicated otherwise.

EXAMPLE 1

A polyester polyol resin solution was prepared by charging the following ingredients into a reaction vessel equipped with an agitator and a vapor condenser:

|  | PARTS BY WEIGHT |
|---|---|
| Dimethyl 1,4-cyclohexanedicarboxylate | 23.40 |
| Isophthalate acid | 25.88 |
| Adipic acid | 5.68 |
| Neopentyl glycol | 36.16 |
| Trimethylolpropane | 8.87 |
| Dibutyltin dilaurate/p-toluene sulfonic acid | 0.30 |
| Toluene | 1.70 |
| TOTAL | 101.99 |

The mixture of ingredients was heated slowly to its reflux temperature. The mixture was held at its reflux temperature until the reaction was completed, which is determined by monitoring the flow of water of esterification from the condenser. The mixture was cooled to about 80° C., agitated for about 1 hour and then filtered. The resulting polyester polyol has a hydroxyl value of about 150, a number average molecular weight of about 1000 -2200 determined by gel permeation chromatography using polystyrene as the standard. The solution was reduced with toluene to a solid content of about 80%.

CONDUCTIVE MILLBASE

A millbase was prepared as follows:

|  | PARTS BY WEIGHT |
|---|---|
| Polyester resin solution (prepared above) | 27.2 |
| Butylated melamine/formaldehyde resin ("Resimine" RS-466 from Monsanto Company) | 15.8 |
| Methyl ethyl ketone | 18.3 |
| Butyl alcohol | 11.0 |
| Conductive pigment [pigment particles of hollow shells of silica with fine crystallites of antimone-doped tin oxide forming a uniform, two-dimensional network on the surface of the silica containg 46% Sn (as $SNO_2$), 22% Si (as $SiO_2$), 18% Ba (as BaO), and 4% Sb (as $Sb_2O_3$)] | 27.7 |
| Total | 100.0 |

The above constituents were mixed together for about 30 minutes and then charged into a conventional sand mill and ground one pass to provide a millbase having a pigment to binder ratio of about 85/100.

A conductive light gray guide coating composition was prepared by mixing together the following constituents:

|  | PARTS BY WEIGHT |
|---|---|
| Gray Millbase (12.64 parts of polyester resin solution, prepared above, 8.13 parts butylated melamine formaldehyde resin, 7.80 parts methyl amyl ketone, 69.28 parts titanium dioxide pigment and 0.15 parts carbon black pigment) | 6.60 |
|  | 7.80 |
| Conductive Millbase (prepared above) | 48.70 |
| "Resiflow" S (50% solution of an acrylic terpolymer flow control agent in "Solveso" 100 aromatic solvent) | 0.10 |
| Silica Base (9% fumed hydrophobic silica pigment dispersed in a melamine resin - 50% weight solids) | 2.50 |
| Polyester Resin Solution (prepared above) | 21.10 |
| Epoxy Resin Solution (75% solids of "Epon" 1001 epoxy resin of epichlorohydrin and bisphenol in 1:1 ratio of butanol/toluene) |  |
| Butylated melamine formaldehyde resin (described above) | 11.30 |
| Castor oil | 0.70 |
| Acid catalyst (70% dodecyl benzene sulfonic acid in isopropanol) | 0.20 |
| "Solveso" 150 (aromatic solvent) | 0.60 |
| Butyl alcohol | 1.00 |
| Methyl amyl ketone | 5.10 |
| Total | 100.00 |

The above constituents were added in the order shown and mixed for about 15 minutes. The resulting guide coating composition has a pigment to binder ratio of about 30/100 of conductive pigment and 10.7/100 of colored pigment.

The composition was sprayed onto unprimed cold roll steel panel and onto elecrocoated epoxyester primed steel panels and baked for about 30 minutes at about 120° C. to provide a light gray finish about 1.0–2.0 mils thick. The finish had a conductivity of about 125 Randsburg units.

A conventional thermosetting acrylic enamel was electrostatically applied to each of the above prepared coated steel panels. The transfer efficiency of the enamel was excellent as could be expected for a conductive substrate and the enamel had excellent adhesion to the guide coat and had automotive level of gloss and distinctness of image.

EXAMPLE 2

A millbase was prepared by blending the following consitituents and charging the resulting blend into a sand mill and grinding one pass. The millbase had weight solids of about 60% and a pigment to binder ratio of about 125/100.

|  | PARTS BY WEIGHT |
|---|---|
| Polyester resin solution (prepared above) | 27.20 |
| "Cymel" 380 (80% solids of a polymeric methylated melamine formaldehyde resin in isobutanol) | 6.00 |
| Diisobutyl ketone | 33.40 |
| Conductive pigment (described in Example 1) | 33.40 |

|  | PARTS BY WEIGHT |
|---|---|
| Total | 100.00 |

A coating composition was prepared by mixing the following constituents:

|  | PARTS BY WEIGHT |
|---|---|
| Millbase (prepared above) | 73.5 |
| Polyester resin solution (prepared above) | 16.3 |
| "Cymel" 380 (described above) | 5.2 |
| "Cymel" 325 (80% solids in isobutanol of a methylated melamine formaldehyde resin having a methoxymethyl imino functionality and a degree of polymerization of 2.3) | 4.7 |
| "Resiflow" S (described in Example 1) | 0.3 |
| Total | 100.0 |

The composition was sprayed onto unprimed cold roll steel panel, electrocoated epoxyester primed steel panel, a phosphatized steel panel and a fiber glass reinforced polester panel, a reaction injection molded urethane panel and a partially crylstalline polyaminde panel. The steel panels were baked for about 30 minutes at about 125° C. The resulting primer finish had a translucent light colored and was about 1.0–2.0 mils thick. The non-metal panels were baked at about 120° C. for about 30 minutes. The resulting finish had a translucent light color and was about 1.0–2.0 mils thick. Each of the primer finishes had a conductivity of about 125 Randsburg units.

A conventional white thermosetting acrylic enamel was electrostatically applied to each of the above prepared coated panels. The transfer efficiency of the enamel was excellent as could be expected for a conductive substrate and the enamel had excellent adhesion to the guide coat and had automotive level of gloss and distinctness of image.

Each of the coated panels passed a ⅛inch mandrel bend test at −29° C. in which the panel is bent 180° with the coating facing outward around a ⅛inch mandrel.

What is claimed is:

1. A conductive coating composition comprising solvent and 40–75% by weight of film forming binder and pigment in a pigment to binder weight ratio of about 1:100 to 100:100; wherein the binder consists essentially of about
   (A) 40–70% by weight, of a hydroxy containing polyester resin having a linear polyester segment with hydroxyl groups and branched polyester segments attached to the linear segment having hydroxyl groups and the polyester resin has a number average molecular weight of about 800–3,500 and a hydroxyl number of about 50–170 and
   (B) 30–60% by weight of an aminoplast crosslinking agent; wherein the pigment comprises an electrically conductive pigment that comprises silica selected from the group consisting of amorphous silica or a silica containing material selected from the group consisting of metal silicates, silica containing glass and material having an extensive covalent network of $SiO_4$ units; said silica being in association with a two-dimensional network of antimony-containing tin oxide crystallites in which the antimony content ranges from about 1-30% by weight of the tin oxide and the composition forms a coating having a surface conductivity of at least 100 Ransburg units.

2. The conductive coating composition of claim 1 in which the conductive pigment comprises an inert core material having a coating selected from the group consisting of an amorphous silica coating or a silica-containing coating which is surface coated with a two-dimensional conducting network of antimony-containing tin oxide crystallites.

3. The conductive coating composition of claim 2 in which the conductive pigment comprises a hollow shell of amorphous silica or silica containing material surface coated with a two-dimensional conducting network of antimony-containing tin oxide crystallites.

4. The coating composition of claim 1, 2 or 3 in which the silica-containing material is a silica-boria material.

5. The coating composition of claim 1 in which the conductive pigment consists of hollow shells of amorphous silica with a two-dimensional conducting network of antimony-containing tin oxide crystallites.

6. The coating composition of claim 5 in which the film forming binder comprises about
   (A) 40-70% by weight of a polyester polyol having reactive hydroxy groups;
   (B) 20-40% by weight of an aminoplast resin; and
   (C) 5-10% by weight of an epoxy resin.

7. The coating composition of claim 1 wherein the composition forms a hard electrically conductive flexible finish on a plastic substrate whereby the coated plastic substrate can be bent 180° around a ½inch mandel with the coating facing outward and tested at −29° C. and the coating has a surface conductivity of at least 125 Ransburg units.

* * * * *